B. C. HUBER & L. S. LEASURE.
STEREOSCOPIC GLASSES.
APPLICATION FILED AUG. 31, 1915.

1,186,786.

Patented June 13, 1916.

Inventors
Berthold C. Huber and
Leland S. Leasure
By Shepherd Campbell
Attorney

UNITED STATES PATENT OFFICE.

BERTHOLD C. HUBER AND LELAND S. LEASURE, OF SAN DIEGO, CALIFORNIA.

STEREOSCOPIC GLASSES.

1,186,786.   Specification of Letters Patent.   Patented June 13, 1916.

Application filed August 31, 1915. Serial No. 48,178.

*To all whom it may concern:*

Be it known that we, BERTHOLD C. HUBER and LELAND S. LEASURE, citizens of the United States, residing at San Diego, in the county of San Diego and State of California, have invented certain new and useful Improvements in Stereoscopic Glasses, of which the following is a specification.

This invention relates to stereoscopic glasses, and it has for its object the provision of an improved device of this character provided with lenses adjustable toward and from each other, screens disposed inwardly of said lenses, and means for supporting the structure upon the nose of the user, whereby a stereoscopic effect is produced when a picture is viewed through said glasses.

Further objects and advantages of the invention will be set forth in the detailed description which now follows.

Figure 1:
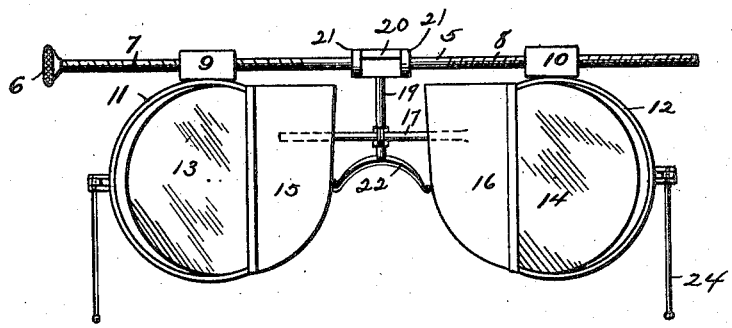
Figure 2:
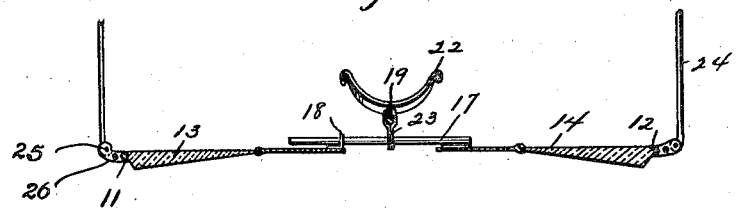
Figure 3:
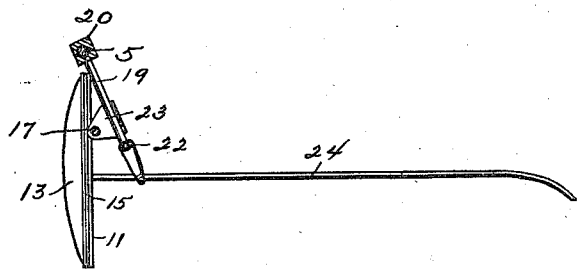

In the accompanying drawing: Figure 1 is a front elevation of a pair of stereoscopic glasses constructed in accordance with the invention. Fig. 2 is a horizontal, sectional view and Fig. 3 is a vertical, sectional view.

Like numerals designate corresponding parts in all of the figures of the drawing.

Referring to the drawing, numeral 5 designates a rotative adjusting rod provided with a knurled operating handle 6. The rod 5 is oppositely threaded at 7 and 8 and blocks 9 and 10 carrying frames 11 and 12 are threaded upon the threaded portions 7 and 8 of the rod 5. Mounted in frames 11 and 12 are the lenses 13 and 14. The front faces of these lenses are disposed at an angle with their rear faces as is best illustrated in Fig. 2, for the purpose of transposing the images, as is well understood. Shields 15 and 16 are carried by the frames 11 and 12 and are disposed inwardly of the lenses and the shield 16 has secured thereto, the rod 17. This rod is slidably mounted in a keeper 18 that is carried by the shield 15. This construction permits the shields and lenses to move toward and from each other while at the same time holding them in proper alinement with each other. The stem 19 is secured to a block 20 in which block the rod 5 turns, collars 21 affixed to the rod holding the block 20 always in a central position with respect to the length of the rod 5 while permitting the rod 5 to turn in said block. The stem 19 carries a nose piece 22 at its lower end. This stem likewise carries ears 23 through which rod 17 passes, and in which the rod slides. The usual ear engaging members 24 are pivoted at 25 to ears 26 of the frames 11 and 12.

By virtue of the construction herein shown and described, it will be seen that the nose piece 22 is always held in central relation to the entire structure, the lenses are adjustable to secure the best possible focus, and the parts are held in proper correlation and alinement; by virtue of all of which the stereoscopic effect is secured.

While the elements shown and described are well adapted to serve the purposes for which they are intended, it is to be understood that the invention is not limited to the precise construction set forth but includes within its purview such changes as may be made within the scope of the appended claims.

Having described our invention what we claim is:

1. In a device of the character described, the combination with a pair of stereoscopic lenses of shields movable therewith and disposed inwardly thereof, a centrally arranged nose piece and means for adjusting said lenses and said shields toward and from said nose piece.

2. In a device of the character described, the combination with a rod, the ends of which are oppositely threaded, of blocks threaded upon such rod, frames carried by said blocks, stereoscopic lenses mounted in said frames and a centrally arranged nose piece supported from said rod.

3. In a device of the character described, the combination with a rod, the ends of which are oppositely threaded, of blocks threaded upon such rod, frames carried by said blocks, stereoscopic lenses mounted in said frames, a centrally arranged nose piece supported from said rod, shields carried by said frames and disposed inwardly of said lenses and movable therewith and slidable guide members between said shields.

4. In a device of the character described, the combination with a rod, the ends of which are oppositely threaded, of blocks threaded upon such rod, frames carried by said blocks, stereoscopic lenses mounted in said frames, a centrally arranged nose piece supported from said rod, shields carried by said frames and disposed inwardly of said lenses and slidable guide members between said shields, said slidable guide means likewise having slidable engagement with said nose piece.

5. In a device of the character described, the combination with a pair of stereoscopic lenses of an adjusting element, means for causing said lenses to move toward and from each other upon said adjusting element, a centrally arranged nose piece supported from said adjusting element, shields disposed inwardly of said lenses and slidable guide means between said shields.

6. In a device of the character described, the combination with a manually rotative rod having its ends oppositely threaded, of blocks threaded upon said rod, frames carried by said blocks, stereoscopic lenses mounted in said frames, ear engaging members secured to said frames, shields carried by said frames and disposed inwardly of said lenses a guide rod fixed to one of said shields and a guide element secured to the other of said shields through which said rod slides, a centrally disposed block in which said manually operable rod freely turns, a stem depending from said block and lying at an angle with relation to said shields, a nose piece carried by said stem and an element carried by said stem and through which said guide rod slides.

7. In a device of the character described, the combination with a pair of lenses, of an adjusting element, means for causing said lenses to move toward and from each other upon said adjusting element, a centrally arranged nose-piece supported from said adjusting element, shields disposed inwardly of said lenses and movable therewith and slidable guide means between said shields which permits movement of the lenses toward and from each other but prevents said lenses from moving out of the same transverse plane.

In testimony whereof we affix our signatures in presence of two witnesses.

BERTHOLD C. HUBER.
LELAND S. LEASURE.

Witnesses:
J. C. HIZAR,
ALBERT J. LEE.